5936X
S. P. Moorehouse,
Lamp Burner.
Patented Apr. 26. 1830.
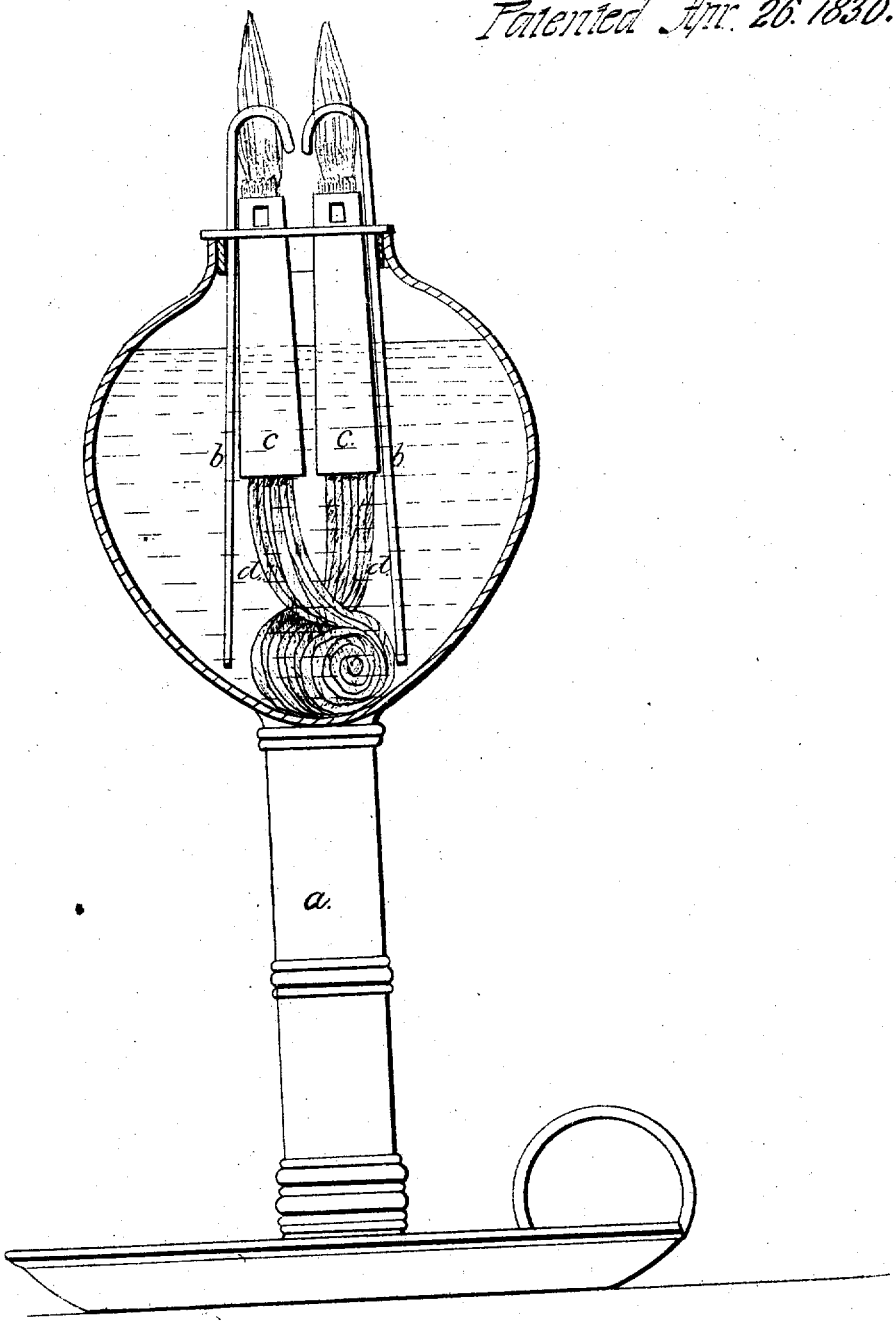

Stephen P. Moorehouse, Monroe, Michigan.
Letters Patent
Dated, April 26th 1830.

The Schedule referred to in these Letters Patent & making part of the same, containing a description in the words of the said Stephen P. Moorehouse himself of his improvement in the Lamp for burning Lard.

---

This Lamp differs in nothing from the ordinary tin Japanned Lamp, than there being placed a copper (or some metal containing copper) wire in the top of it & near to the tubes containing the wicks & around which wire the flame plays. This wire being of copper, or of some metal containing copper, is a good conductor of heat & reaches far down into the body of the Lamp. The tubes for the wicks are also of copper or of some metal containing copper. This lamp is constructed for the purpose of burning Lard instead of oil. The lard being much cheaper & producing a more agreeable light. The wire & the tubes keep the lard in a liquid State. Dated April 15th 1830.

Witnesses
Benjn. Joy
O. B. Curran

Stephen P. Moorehouse (180 wds)

---

[illegible]